Nov. 18, 1969  R. H. HEIMANN  3,479,196
METHOD AND MEANS FOR PROCESSING TISSUE
Filed June 10, 1966  2 Sheets-Sheet 2
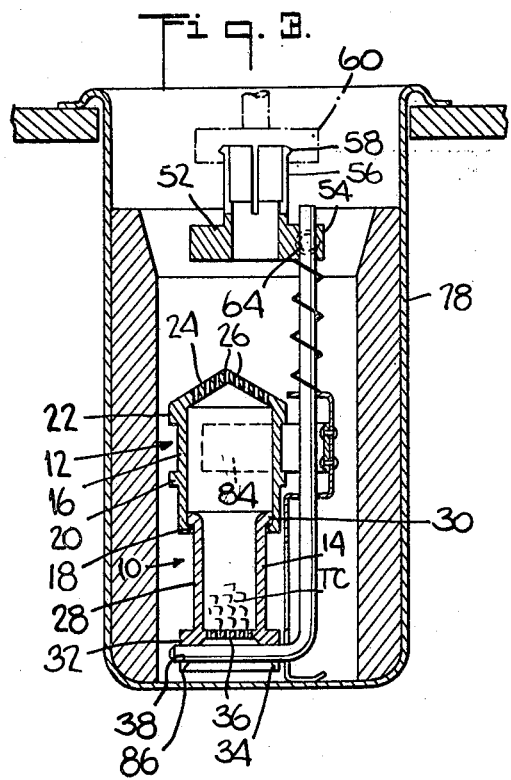
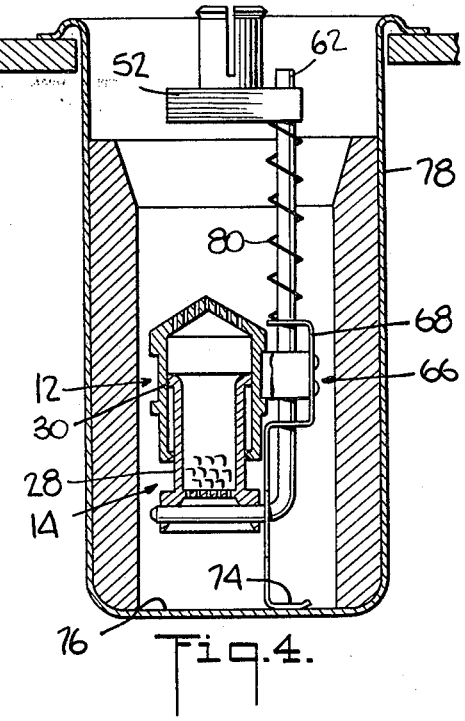
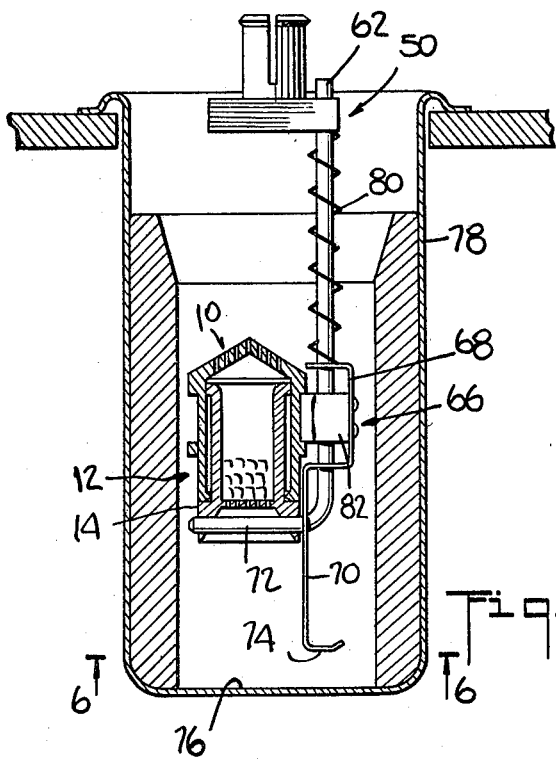
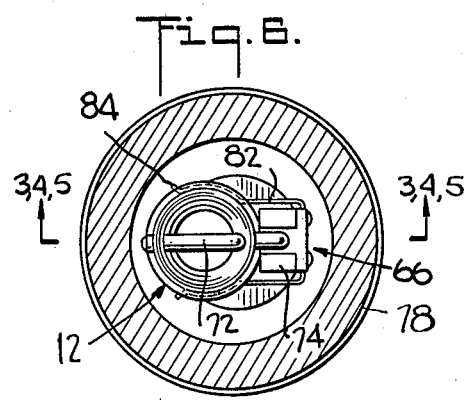
INVENTOR.
RICHARD H. HEIMANN
BY Harry Cohen
ATTORNEY United States Patent Office 3,479,196
Patented Nov. 18, 1969

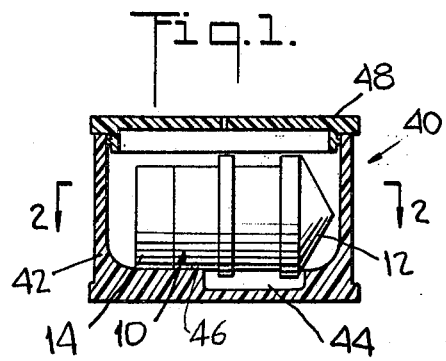
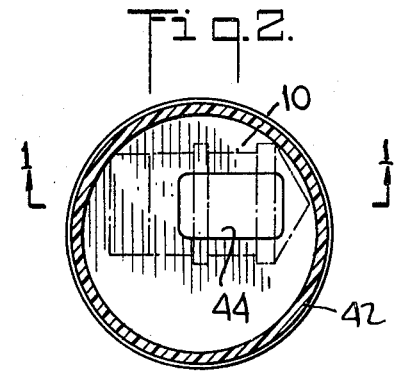
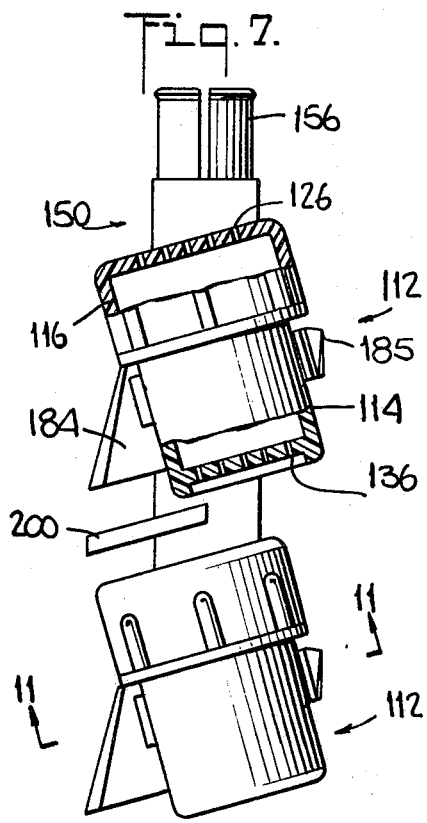
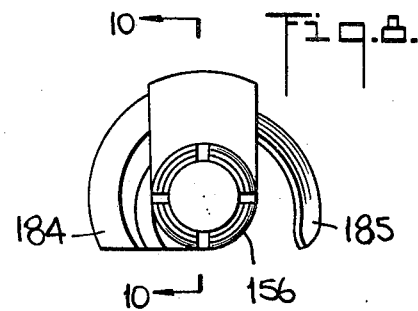
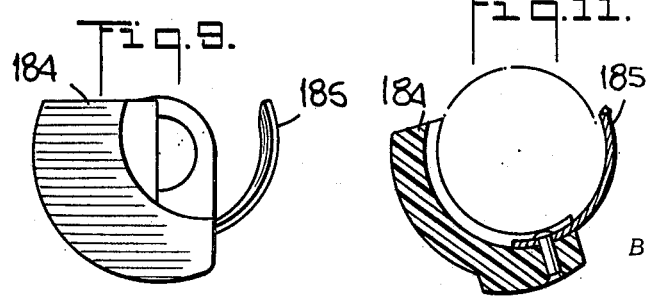
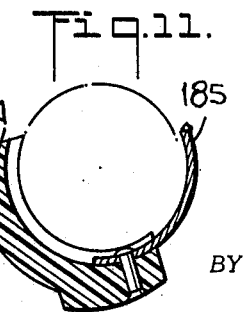

3,479,196
METHOD AND MEANS FOR PROCESSING TISSUE
Richard H. Heimann, Flushing, N.Y., assignor to Technicon Corporation, Ardsley (Chauncey), N.Y., a corporation of New York
Filed June 10, 1966, Ser. No. 556,764
Int. Cl. A01n 1/00; B05c 3/00
U.S. Cl. 117—3       16 Claims

ABSTRACT OF THE DISCLOSURE

Apparatus and process for treating and fixing solid animal and plant tissue samples includes a sample container having snapped-interlocked telescoping portions, the respective ends being apertured to allow passage of a fixative liquid. The sample jar is disposed within a beaker containing fixative liquid, the beaker being oscillated to produce a flow of fixative liquid, through the sample container. Also, the sample container can be telescoped so as to circulate, or pump, the fixative liquid through the sample container.

---

This invention relates to a method and an apparatus for the infiltration processing of tissue for histological examination, and is particularly suitable for processing tissue for examination by electron microscopy.

It is customary in preparing tissue for electron microscopy to commence the fixing of the tissue as soon as possible after the receipt thereof. The immediate fixation of the tissue not only preserves the cells and intracellular substances, but also prevents the post-mortem changes that ordinarily take place due to the putrefactive action of bacteria.

In the U.S. Patent No. 3,411,481, issued to Jack Isreeli and Richard H. Heimann on Nov. 19, 1968, and assigned to a common assignee, there is taught a method and an apparatus for the infiltration processing of small cubes of tissue, on the order of a 1 mm. cube. Each of these cubes of tissue is disposed in a respective capsule in which it is both fixed and infiltrated. However, it is frequently desirable to fix the tissue either as soon as it is cut up into cubes, e.g. 50 to 250 in number, suitable for encapsulation, and to leave for a later time the selection of those cubes which are to be ultimately encapsulated.

It is, therefore, an object of this invention to provide a method, and an apparatus therefor, for the fixing and subsequent processing of a large number of cubes of tissue.

A feature of this invention is the provision of a method and an apparatus for the circulation of processing fluids through containers within which a large number of cubes are disposed.

These and other objects and features of this invention will become apparent upon consideration of the following specification taken in conjunction with the accompanying drawing in which:

FIG. 1 is a view in elevation of a beaker with a cover, showing a tissue containing jar disposed therein, for the immersion of the tissue in a fixative solution, taken in cross-section along plane 1—1 of FIG. 2;

FIG. 2 is a view in plan of the beaker taken in cross-section along the plane 2—2 of FIG. 1;

FIG. 3 is a view in elevation of the tissue containing jar, mounted on a clip which is suspended from an overhead boom or plate device and disposed in a beaker, for the immersion of the tissue in any one of several processing liquids, taken in partial cross-section along the plane 3—3 of FIG. 6;

FIGS. 4 and 5 are views similar to FIG. 3, showing different dispositions of the tissue containing jar;

FIG. 6 is a view in plan taken along the plane 6—6 of FIG. 5;

FIG. 7 is a view in elevation of another embodiment of this invention showing two tissue containing jars of fixed volume, and a clip for suspending these jars at an angle to the vertical;

FIG. 8 is a top plan view of the clip, without the jars of FIG. 7;

FIG. 9 is a bottom plan view of the clip, without the jars of FIG. 7;

FIG. 10 is a view in elevation of the clip, without the jars, taken in cross-section along the plane 10—10 of FIG. 8; and FIG. 11 is a view of the clip, without the jars, taken in cross-section along the plane 11—11 of FIG. 7.

The tissue containing jar 10 comprises a head portion 12 and a tail portion 14 disposed in snap-interlocked telescoping relation. After the fresh tissue has been minced into cubes of the magnitude of one millimeter on a side, these cubes TC, which may number from 50 to 250, are disposed in one portion of the jar and the other portion is snapped thereon. The jar may be made of polyethylene, polypropylene or other acid resistant, resilient material.

The head portion 12 comprises a tubular wall 16 having a lower inner annulus 18, an intermediate outer annulus 20, and an upper annulus 22 which extends into a cone shaped top subportion 24. The cone shaped top subportion has a plurality of spaced apart, parallel slots 26 therethrough.

The tail portion 14 comprises a tubular wall 28, an upper outer annulus 30, and a bottom subportion 32. The bottom subportion has a longitudinal truncated cone shaped bore 34 therein which leads to a plurality of longitudinal bores 36 therethrough; and a diametrical bore 38 therethrough.

The tissue containing jar 10 is disposed in a beaker set 40 for the fixation of the contained tissue. The beaker set comprises a beaker 42 having a recess 44 in the inner bottom surface 46 thereof, and a closely fitting cover 48. The recess 44 is adapted to receive the head portion 12 of the tissue containing jar with its longitudinal axis disposed parallel to the plane of the inner bottom surface, with the slots 26 disposed above the surface 46, and the tail portion disposed above the surface 46. The recess 44 serves to locate the jar 10 on a geometric chord which is at substantially the maximum radial distance from the longitudinal, vertical axis of the beaker 42.

In use, the tissue containing jar 10 is disposed in the recess in the beaker, fixative solution is poured into the beaker to cover the jar, and the cover 48 is pressed on. The filled beaker set is subjected to an oscillatory motion, such as in a rack driven by an oscillatory drive shown in Patent No. 3,411,481, supra. The oscillatory motion of the beaker set and the tissue containing jar therein provides a relative rotating wave front around the longitudinal axis of the beaker set which circulates the fixative solution through the tissue containing jar via the slots 26 and the bores 34, 36 therein.

After the tissue in the jar 10 has been adequately fixed, the beaker set is removed from the oscillating drive and is opened, and the tissue containing jar is removed therefrom. The jar 10 is now fitted onto a clip device 50 for further processing. The clip device includes a snap 52 having a flange portion 54, and a plug portion 56 formed with split fingers and an annular bead 58. The plug portion is adapted to snap into a socket 60 attached to the vertically reciprocating and horizontally rotating plate shown in Patent No. 3,411,481, supra. An L-shaped rod 62 is fixed to and depends from a bore 64 in the plug flange portion 56. A multi-fingered clip 66 is mounted to and rides on the rod 62. The clip 66 includes a vertically disposed U-shaped portion 68 having an aperture in each leg through which the rod passes, the lower leg having a downwardly directed extension 70 which is bifurcated to clear the lower leg 72 of the L-shaped rod 62. Each of the bifurcations of the extension 70 terminates in a foot 74 which is adapted to abut the bottom 76 of a processing beaker 78. A compression spring 80 is disposed over the rod 62 between the flange 54 and the upper leg of the U-shaped portion 68, and serves to bias the clip 66 downwardly, away from the snap 52. An additional U-shaped portion 82 which is horizontally disposed, is attached, as by riveting, to the portion 68. The arms of this portion 82 each have a concave reverse bend 84 therein. The issue containing jar is fitted onto the clip device 50 with the bent arms 84 encircling the head portion 12 between the annuli 20 and 22, and the lower leg 72 of the L-shaped rod 62 passing through the bore 38 in the tail portion 14.

A plurality of beakers 78 are provided, one or more for each processing liquid, as described in Patent No. 3,411,410, supra. The therein described plate to which the clip device 50 is fastened intermittently reciprocates up and down and intermittently rotates to insert the clip device and its attached thereto tissue containing jar sequentially into each of the beakers 78 and the processing liquids respectively contained therein. While the clip and jar are disposed in any given beaker, the plate continuously reciprocates a short distance, maintaining the jar in the processing liquid. At the bottom of such a short reciprocation, as shown in FIG. 3, the feet 74 of the clip 66 abut the bottom 76 of the beaker, causing the clip 66 to ride up the rod 62 against the bias of the spring 80. The clip carries the head portion 12 of the jar upwardly, from the relatively fixed to the rod leg 72 tail portion 14, causing the jar to be extended to its maximum length and internal volume. At the top of such a short reciprocation, as shown in FIG. 4, the snap 52 having been elevated, the spring 80 provides relative movement between the clip 66 and the rod 62, and the clip 66 carries the head portion 12 toward the tail portion, causing the jar to be contracted to an intermediate length and internal volume. As the plate raises the entire clip device and the jar to remove them from a beaker, as shown in FIG. 5, the spring 80 provides maximum relative movement between the clip 66 and the rod 62, and the clip 66 carries the head portion 12 toward the tail portion, causing the jar to be telescoped to its minimum length and internal volume. The pumping action provided by this short length reciprocation of the head and tail portions provides a circulation of the processing fluid into and out of the jar through the slots 26 and the bores 34, 36. The telescoping of the jar to its minimum volume, when a transfer of the jar from one beaker to the next successive beaker is to be accomplished, ensures that a minimum of processing fluid is carried up within the jar as it is raised above the beaker, and that a minimum of time is required for this carried up fluid to drain out of the jar before the jar may be shifted over to the next beaker and inserted therein.

The time required for drainage of the jar is further reduced by the shapes of the ends of the jar. The outer sloping surface of the cone 24 of the head portion provides for a rapid drain-off and thinning of any film of treating liquid thereon, especially the central area; to permit an early puncturing of this film by the atmosphere to downwardly enter the slots 26 to fill any partial vacuum in the jar which tends to develop as the treating liquid drains through the bores 36. The development of a partial vacuum in the jar would tend to slow the drainage of the treating liquid through the bores 36. Further, the truncated-cone shaped bore 34 provides an annular knife-edge 86 in the bottom subportion of the tail part which speeds the falling off of droplets of treating liquid from the bottom subportion.

It should be noted that the treating liquids may be quite viscous, particularly those used in the latter part of the processing cycle, which may be comprised of resins in a solvent. As shown in Patent No. 3,411,481, all of the sample containers are raised out of the beakers, drained, and shifted over and into the next beakers concurrently, and, therefore, the slowest drainage time of any liquid determines the drainage time for all of the beakers.

It will be appreciated that a jar of minimal and fixed length may be utilized if this pumping action is not required. In such a case the larger diametered head or cap of the jar would be disposed in the recess 44 of the beaker set with its longitudinal axis, if desired, parallel to the shorter dimension of the recess. This fixed jar would still lie on a geometrical chord which would be radially spaced from the center of the beaker set. In lieu of the clip device 50 illustrated a non-relative movement clip device would be utilized, having a plug portion, and one or two horizontally disposed U-shaped clip portions to hold one or two such fixed jars.

Such a jar is shown in FIG. 7. Here two fixed volume jars 112, each having a head portion 116 and a tail portion 114 are mounted on a clip device 150. Each head portion 116 has a plurality of spaced apart, parallel longitudinal slots 126 and each tail portion 114 has a plurality of longitudinal bores 136, some of which are tangent to the inner surface of the tubular wall of the tail portion. The clip device 150 includes a plug portion 156 which is integral with a longitudinally extending vertical spine portion 162 which includes means to hold the jars at an angle to the vertical, e.g., 15°. Two rigid curved arms 184 integrally extend from the spine portion, and two resilient curved arms 185 are fastened to and extend from the spine portion. Each set of one rigid and one resilient arm provide a tubular cavity having a longitudinal axis which is disposed at an angle, e.g., 15°, to the vertical, which adapted to have a jar snapped thereinto. This tilting of the jar shortens the draining time of the jars between beakers, in that the treating fluids tend to slide off the tilted top of the jar to permit an early penetration of the film over the slots 126 by the atmosphere, in a manner similar to that provided by the cone shaped surface 24 of the first species. A diverter plate 200 is disposed between the two jars, extending on one side over and beyond the lowest corner of the bottom of the upper jar, and extending on the other side over and beyond the lower corner of the top of the lower jar. This plate diverts liquid draining from the upper jar from falling onto the lower jar. The rigid arm 184 is made substantially triangular in cross-section, with the base of the triangle down, to provide a turbulence in the liquid as the clip and jars are reciprocated up and down to provide a stirring of this liquid.

It will be understood that the invention may be embodied otherwise than as herein shown or described and that certain changes in the detail of construction and in the form and arrangement of parts may be made without departing from the underlying idea or principles of this invention within the scope of the appended claims.

What is claimed is:

1. A method of processing solid animal or plant tissue samples comprising: disposing the samples in a sample container having longitudinally spaced apart walls with fluid-passing apertures therein; disposing said sample container in a larger container in fixed relation thereto with said apertured walls laterally spaced from the diameter of said larger container; disposing a fixative fluid in said larger container and oscillating said larger container, and thereby said sample container, to produce a rotating flow of said fixative fluid in said larger container which passes through said apertured walls of said sample container.

2. The method according to claim 1 wherein said larger container is oscillated about a vertical axis and said apertures have longitudinal axes which are disposed horizontally.

3. The method according to claim 1 wherein said samples are disposed in an elongated container having apertured ends, said container is oscillated about a vertical central axis, and said elongated container is disposed along a geometrical chord at substantially the maximum radial distance from said central axis of oscillation.

4. A method of treating solid animal or plant tissue samples comprising: disposing the samples in an apertured container having telescoping portions; disposing the container in a larger container containing a treating liquid; and repeatedly extending and contracting the telescoping portions to enlarge and contract the inner volume of the apertured container.

5. A method of processing solid animal or plant tissue samples comprising: disposing the samples in a closed container having apertures in the upper end thereof with an upper outer surface through which said apertures pass; initially reciprocating the apertured container in a treating liquid to contact said samples with a stream of said treating liquid; and finally raising the apertured container from said treating liquid to drain out any treating liquid from said container and disposing said upper outer surface at an angle to the horizontal to rapidly drain treating liquid from said upper outer surface to rapidly thin any film of treating liquid overlying the upper ends of said apertures.

6. Apparatus for processing solid animal or plant tissue samples comprising: a larger container adapted to receive and hold a treating liquid; means for providing said larger container with oscillatory movement about a vertical axis; a smaller container having two longitudinally spaced apart groups of apertures therein adapted to receive and hold solid samples therein; and means for securing said smaller container in a fixed disposition within said larger container with the longitudinal axis of said smaller container spaced from said vertical axis.

7. Apparatus according to claim 6 wherein said apertures have substantially horizontal bores.

8. Apparatus for treating solid animal or plant tissue samples comprising: a first cup shaped member disposed in telescoping relation with a second cup shaped member, their respective open ends being mutually adjacent, and their respective closed ends being mutually remote and respectively apertured, to form an apertured container for receiving samples to be treated: means for disposing said first and second members in a treating liquid and for repeatedly telescopically extending and contracting said first and second members to repeatedly enlarge and contract the contained volume of said container, and for withdrawing said container from the treating liquid.

9. Apparatus according to claim 8 wherein said container has a longitudinal axis which is disposed vertically; the closed end of the upper one of said first and second members has a downwardly diverging cone-shaped outer surface through which its respective apertures pass.

10. Apparatus according to claim 9 wherein the closed end of the upper one of said first and second members has a downwardly diverging, at least in part, cone-shaped outer surface which forms an annular sharp corner with the adjacent outer surface of the tubular wall of said lower member.

11. Apparatus according to claim 8 further including an additional container for receiving the treating liquid and said apertured container; traversing means disposed over said additional container traveling a path which reciprocates vertically over a short distance and intermittently rises a relatively longer distance; said disposing means comprising a first member fixed to said traversing means and to said lower container member and a second member fixed to said upper container member and having a portion extending downwardly beyond said lower container member towards the bottom of said additional container, and biasing means coupled between said first and second members for biasing them apart; whereby when said traversing means is lowermost in said path of reciprocation said second member downwardly extending portion abuts said bottom of said additional container causing relative movement of said second and first members against said biasing means to extend said apertured container, when said traversing means is uppermost and withdrawn from the liquid said second member downwardly extending portion is free of said bottom of said additional container and said second and first members are biased apart by said biasing means to fully contact said apertured container.

12. Apparatus according to claim 11 wherein said first member is a rod, said second member is a clip mounted for movement on said rod, and said biasing means is a compression spring mounted on said rod and abutting said clip.

13. Apparatus for processing solid animal or plant tissue samples comprising: a large container for receiving a treating liquid; a relatively smaller container for receiving the samples; means for reciprocating said smaller container in the treating liquid and for raising said smaller container out of the liquid; said smaller container having an apertured upper outer surface; said reciprocating means disposing said apertured surface at an angle to the horizontal when said smaller container is raised out of the liquid.

14. Apparatus according to claim 13 wherein said upper outer surface is cone shaped.

15. Apparatus according to claim 13 wherein said upper outer surface is flat.

16. Apparatus according to claim 13 wherein the lowermost portion of said small container, when said container is disposed in said raised disposition, is a relatively sharp edge.

References Cited
UNITED STATES PATENTS

| | | | |
|---|---|---|---|
| 771,158 | 9/1904 | Kenney | 134—117 |
| 808,380 | 12/1905 | Jones | 134—121 |
| 934,346 | 9/1909 | Pearce | 134—121 |
| 1,697,001 | 1/1929 | Esser | 134—136 |
| 1,793,798 | 2/1931 | Harker | 134—121 |
| 2,393,580 | 1/1946 | Weiskopf | 117—3 |
| 2,419,859 | 4/1947 | Tarr et al. | 134—117 XR |
| 2,886,046 | 5/1959 | Du Gal | 134—121 XR |
| 3,116,744 | 1/1964 | Hager | 134—121 |
| 3,302,607 | 2/1967 | Kobernick | 134—121 XR |
| 3,350,220 | 10/1967 | Isreeli | 134—26 XR |
| 2,783,180 | 2/1957 | Whitehead | 424—3 XR |

MORRIS O. WOLK, Primary Examiner

B. S. RICHMAN, Assistant Examiner

U.S. Cl. X.R.

21—2, 58, 61; 117—113; 118—416, 500; 134—121, 136